(12) United States Patent
Westhues et al.

(10) Patent No.: US 11,710,185 B1
(45) Date of Patent: Jul. 25, 2023

(54) SMART ESTIMATICS METHODS AND SYSTEMS

(71) Applicant: STATE FARM MUTUAL AUTOMOBILE INSURANCE COMPANY, Bloomington, IL (US)

(72) Inventors: John Westhues, Normal, IL (US); Leann Dionesotes, Bloomington, IL (US); David Ruby, Normal, IL (US); John Dillard, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 795 days.

(21) Appl. No.: 16/411,605

(22) Filed: May 14, 2019

Related U.S. Application Data

(60) Provisional application No. 62/671,228, filed on May 14, 2018.

(51) Int. Cl.
| | | |
|---|---|---|
| G06Q 40/00 | (2023.01) | |
| G06Q 40/08 | (2012.01) | |
| G06N 20/00 | (2019.01) | |
| G06Q 30/0645 | (2023.01) | |

(52) U.S. Cl.
CPC ............ *G06Q 40/08* (2013.01); *G06N 20/00* (2019.01); *G06Q 30/0645* (2013.01)

(58) Field of Classification Search
CPC ..... G06Q 40/08; G06Q 30/06; G06Q 30/0645; G06N 20/00
USPC ................................................ 705/4, 35-45
See application file for complete search history.

(56) References Cited

U.S. PATENT DOCUMENTS

| | | | | |
|---|---|---|---|---|
| 10,354,230 | B1* | 7/2019 | Hanson et al. | G06Q 40/08 |
| 2002/0188479 | A1* | 12/2002 | Renwick et al. | G06Q 40/08 |
| | | | | 705/4 |
| 2014/0052478 | A1* | 2/2014 | Weinstock et al. | G06Q 40/08 |
| | | | | 705/4 |
| 2017/0148101 | A1* | 5/2017 | Franke et al. | G06Q 40/08 |

\* cited by examiner

*Primary Examiner* — Jessica Lemieux
*Assistant Examiner* — Mohammed H Mustafa
(74) *Attorney, Agent, or Firm* — Marshall, Gerstein & Borun LLP

(57) ABSTRACT

A method for providing smart auto rental estimatics to a user includes training a machine learning model to predict repair information, receiving a report, analyzing the report to identify a coverage, determining a vendor, receiving a chosen vendor, determining a branch, receiving a chosen branch, analyzing the report and a volume data using the trained machine learning model to determine loss information, calculating out-of-pockets, and transmitting the out-of-pockets to the user.

18 Claims, 8 Drawing Sheets

300

Core Select Service eligibility
(Loss is reported by Insured or Insured's Relative or State Farm Agent Office) OR
(Loss is reported by the Contractor, Insured Attorney, Public Adjuster, and Other and verbal permission indicator is checked) and
(Collision coverage and Collision COL) or (Comprehensive coverage and comprehensive COL) and
Date of loss is less than 180 days from Date Reported and
Policy status is in force and
The insured described vehicle on the policy and
Excluded driver indicator is not checked and
(Unlisted driver is not Yes) or (Unlisted driver is Yes AND renting/leasing is No) and
Business vehicle is not yes and
Passengers transported for a fee is not Yes and
Vehicle is damaged and
Record only indicator is not checked and
Tow only indicator is not checked

FIG. 3

SMART ESTIMATICS METHODS AND SYSTEMS

CROSS-REFERENCE TO RELATED APPLICATION

The present application claims priority to U.S. Application No. 62/671,228, filed May 14, 2018. The priority application, US 62/671,228 is hereby incorporated by reference.

FIELD OF THE DISCLOSURE

The present disclosure is directed to providing smart auto estimatics and, more specifically, to techniques for training a machine learning model to predict a time to repair and a cost to repair and to calculate out-of-pockets.

BACKGROUND

In various applications a need exists for estimatics to assist customer service users and policy holders. Estimatics is a field in which estimatics appraisers use estimating systems to evaluate/prepare competitive auto repair estimates, use estimating vendor tools and proprietary computer systems, and apply personal/institutional knowledge of market value and other factors affecting repairability issues. Estimatics appraisers, or "appraisers", may refer information on possible vehicle total loss claims to appropriate contacts, evaluate auto repair bid content and photo documentation, vehicle damage, causation issues, and potential suspicious loss indicators. Appraisers may work in an office or in the field. Appraisers may prepare estimates that accurate assess vehicle damage using computerized estimating equipment, identify and communicate repairability issues and vehicle condition on potential total loss claims, communicate repair estimate information to claim leadership, claim handlers, customers, agents, and repair facilities, or "shops". However, estimatics appraisers may be limited by lack of experience, lack of tenure, cognitive bias, fatigue, and other problems which do not affect computerized estimatics methods and systems. Estimatics appraisers may also not be able to track the potentially large number of inputs to an estimatics model, and may not be able to execute multiple models in sequence and/or simultaneously.

Scale, disparate tools, and inability to quantify performance are additional problems in the current state of the art. Estimatics are performed on a large scale, with more than 300,000 being made per month at a single insurer in the auto industry. Estimatics assignments are a basic need of nearly every auto claim, yet claim associates and appraisers must use multiple applications to understand availability and eligibility on every assignment. The multiple tools only determine what is available to a policy holder or customer, but do not help determine the best option for the customer based on specific claim characteristics and integrated shop data. As a result, customers are often offered and often accept an estimatics option that may not be the best option for them. This sub-optimal modeling leads to customer frustration, channel switching, increased call-backs, and reduced automation. Accordingly, there exists a need for technology enhancements for simplifying availability and eligibility of assignments, and introducing personalization based on similar characteristics of historical claims. Metrics and reporting may be aligned to these outcomes so that leaders may coach associates with these outcomes in mind, and to quantify and improve performance.

BRIEF SUMMARY

The present disclosure generally relates to systems and methods for providing smart auto estimatics. Embodiments of exemplary systems and computer-implemented methods are summarized below. The methods and systems summarized below may include additional, fewer, or alternate components, functionality, and/or actions, including those discussed elsewhere herein.

In one aspect, a computer-implemented method for providing smart auto rental estimatics to a user may include training a machine learning model associated with a plurality of training parameters to predict a time to repair and a cost to repair, receiving an auto loss report, analyzing the auto loss report to identify a vehicle rental coverage associated with the user, determining a candidate set of vehicle rental vendors, receiving an indication of a chosen vehicle rental vendor from a set of vehicle rental vendors, determining a set of vehicle rental branches based on the chosen vehicle rental vendor, receiving an indication of a chosen vehicle rental branch wherein the rental branch is included in the set of vehicle rental branches, analyzing the loss report and a volume data using the trained machine learning model to determine a loss time to repair and a loss cost to repair, calculating a set of estimated out-of-pockets each corresponding to a vehicle class based on the loss time to repair, the loss cost to repair, and transmitting the set of estimated out-of-pockets.

In another aspect a computing system includes one or more processors and one or more memories storing instructions. The instructions, when executed by the one or more processors, cause the computing system to train, via the one or more processors, a machine learning model associated with a plurality of training parameters to predict a repair time to repair and a cost to repair, receive, via the one or more processors, an auto loss report, analyze the auto loss report to identify a vehicle rental coverage associated with the user, determine, via the one or more processors, a candidate set of vehicle rental vendors, receive, via the one or more processors, an indication of a chosen vehicle rental vendor, the chosen vendor included in the candidate set of vehicle rental vendors, determine, based on the chosen vehicle rental vendor and the location of the user, a set of vehicle rental branches, receive, via the one or more processors, an indication of a chosen vehicle rental branch, the chosen vehicle rental branch included in the set of vehicle rental branches, analyze, using the trained machine learning model, the loss report and a volume data to determine a loss time to repair and a loss cost to repair, calculate, based on the loss time to repair, the loss cost to repair, and the vehicle rental coverage a set of estimated out-of-pockets each corresponding to a respective vehicle class; and transmit, via the one or more processors, the set of estimated out-of-pockets.

In another aspect, a non-transitory computer readable medium is provided. The non-transitory computer readable medium contains program instructions that when executed, cause a computer to train, via the one or more processors, a machine learning model associated with a plurality of training parameters to predict a repair time to repair and a cost to repair, receive, via the one or more processors, an auto loss report, analyze the auto loss report to identify a vehicle rental coverage associated with the user, determine, via the one or more processors, a candidate set of vehicle rental vendors, receive, via the one or more processors, an indication of a chosen vehicle rental vendor, the chosen vendor included in the candidate set of vehicle rental vendors, determine, based on the chosen vehicle rental vendor and the location of the user, a set of vehicle rental branches, receive, via the one or more processors, an indication of a chosen vehicle rental branch, the chosen vehicle rental branch included in the set of vehicle rental branches, analyze, using the trained machine learning model, the loss report and a volume data to determine a loss time to repair and a loss cost to repair, calculate, based on the loss time to repair, the loss cost to repair, and the vehicle rental coverage a set of estimated out-of-pockets each corresponding to a respective vehicle class; and transmit, via the one or more processors, the set of estimated out-of-pockets.

BRIEF DESCRIPTION OF THE DRAWINGS

The figures described below depict various aspects of the system and methods disclosed therein. It should be understood that each figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein:

FIG. 3 depicts an example eligibility rule set used to determine select service eligibility, according to one embodiment and scenario.

Figure 1A:
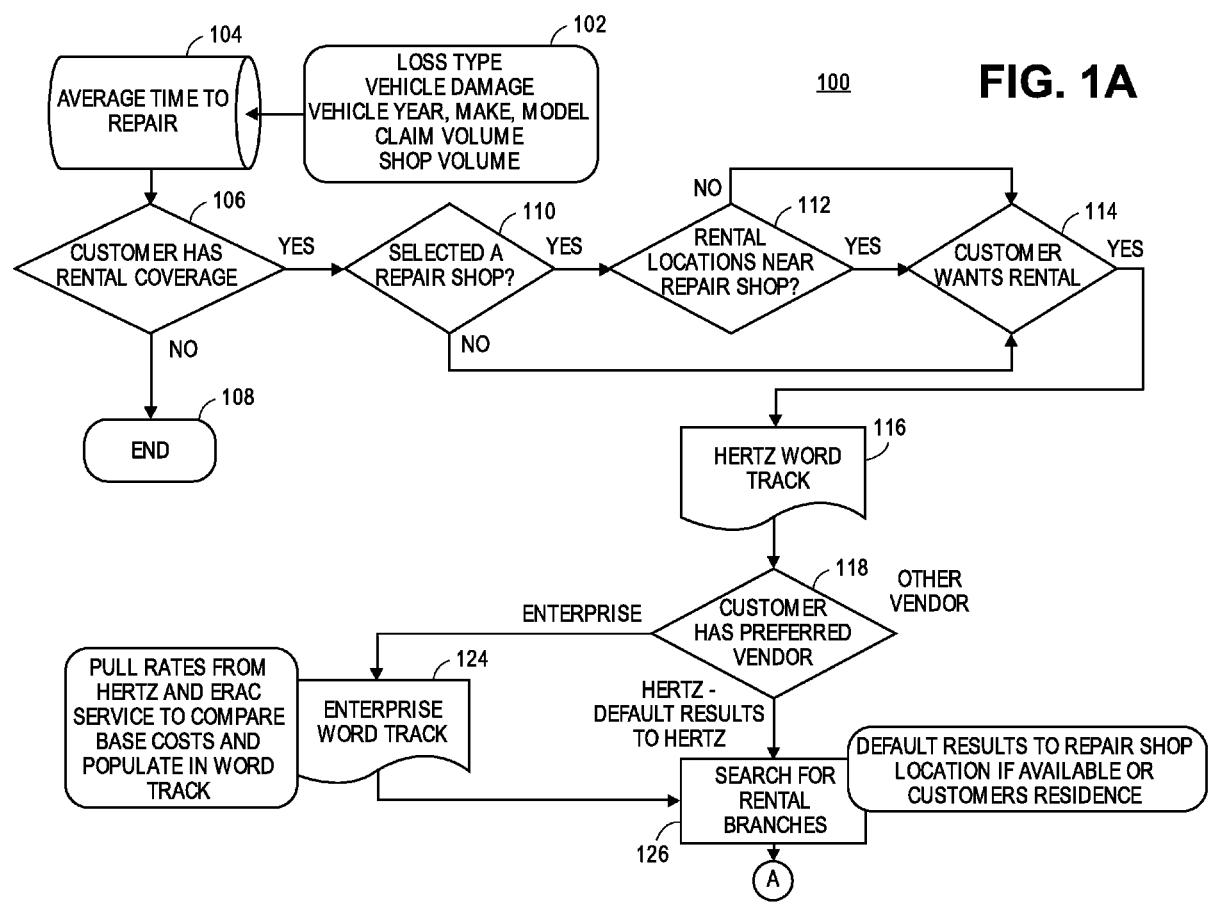
FIG. 1A and FIG. 1B are flow diagrams depicting an example process for providing smart rental estimatics, according to one embodiment.

The figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The embodiments described herein relate to, inter alia, providing smart auto rental estimatics and smart auto repair estimatics to customers. Herein, customers may also be referred to as "users" and/or "policy holders." More specifically, in some embodiments, machine learning (ML) techniques are used to train an ML model by, analyzing a plurality of training parameters, to predict a time to repair and cost to repair based on information provided by a customer in a loss report. For example, an ML model may be trained using historical claims data. The type of loss associated with a past claim (e.g., personal injury, property damage, etc.) may be analyzed, as may the nature of damage in auto claims (e.g., textual descriptors such as "scrape", "dent", etc.). A repair cost amount associated with the historical claim may be analyzed to train an ML model, as may the length of time any such repairs took to complete. The loss types and vehicle damage information may be encoded as labels in a labeled data set that is used to train an ML model. The labeled data training set may also include vehicle feature information relating to the year, make, and model; in addition to whether the vehicle includes certain features such as vehicle telematics, autonomous or semi-autonomous driving capabilities, etc. The general class of the vehicle (e.g., van, passenger vehicle, sports car, etc.) may be an input to the ML model. The labeled data set may be used to train a first ML model which may output a loss time to repair and a loss cost to repair, one or both of which may be combined with real-time information pertaining to 1) claim volume and/or 2) shop volume to calculate a loss time to repair and loss cost to repair. For example, claim volume in a particular geographic area may be gathered to advise a customer whether claim volume is low/medium/high, and to estimate potential impacts on repair time. In some embodiments, the methods and systems may train the ML model using historical shop volume and/or historical claim volume in addition to historical claim information. The loss time to repair and loss cost to repair may be a product representing a difficulty, or cost, of a repair based on the training using historical data and current business realities that may affect the length of time for completing the repairs.

The customer may provide a loss report including documentation (e.g., descriptions, diagrams, specifiers selected from predetermined lists, photographs, etc.) of the loss, which may be analyzed by the trained ML model. Given a customer's vehicle coverage, a vehicle rental vendor, a vehicle rental branch, and a set of vehicle rental classes (e.g., economy, hybrid, sports utility vehicle, intermediate, premium, etc.), the loss repair information (defined herein as loss time to repair and loss cost to repair) may be used in a smart auto repair estimatics method to compute estimatic out-of-pockets to the customer of a rental in each of the set of respective vehicle classes.

Herein, the customer (generally defined as a policy holder, claimant, and/or relative/designee thereof) may interact with the smart estimatics methods and systems directly via an automated telephone system, a mobile application, a desktop application, etc.; or indirectly via a customer service representative who is interacting with the customer in-person or via an electronic communication system such as via telephone, email, text message, etc. Word tracks may be conveyed to a user directly such as by the playing of a pre-recorded message or the display of a message on a screen, and/or indirectly when dictated or otherwise communicated to the customer by a customer service user. That is, a customer may interact with the methods and systems herein in a fully automated fashion and/or with the assistance of a customer service user who may be a human or an AI assistant.

I. Rental Estimatics

FIG. 1 depicts an estimatics rental process 100 for providing rental estimatics to a user. The process 100 may be initiated at the time that a customer contacts an insurer to report an auto damage claim or loss. In the estimatics rental process 100, the methods and systems collect ML parameters (block 102). The ML parameters may be extracted from a loss report, which is a document specific to a particular loss event (e.g., a car accident or other occurrence causing damage to a covered vehicle). In addition, or alternatively, the ML parameters may be received via telephone by an automated system and/or a customer service user such as a telephone operator/representative employed by the insurer or a third party. An average time to repair or cost to repair may be computed (block 104) by the trained ML model using one or more of the ML parameters as input. The estimatics rental process 100 may determine whether the customer has rental coverage (block 106) by, for example, querying an electronic database containing customer insurance policy information. The customer may be identified automatically by, for example, mapping the telephone number of a customer calling by telephone to the telephone number in a policy. The customer may be identified by via login to a website, via an attended or automated telephone call interface, or via other suitable means. If the process 100 determines that the customer does not have rental coverage, then the process 100 may abort processing of the rental estimatics workflow (block 108). Determining whether the customer has rental coverage may include one or more eligibility checks, as described herein.

Once the process 100 identifies the customer, the process 100 may determine whether the customer has selected a repair shop by receiving a selection from the customer in a computer application, or verbally or via a telephone touchpad if in a telephone context (block 110). If the customer selects a repair shop, then the process 100 may determine a set of rental locations near the repair shop by reference to a shop location application programming interface (API) (block 112). Herein, the methods and systems may receive indications from a customer, and the indications may be received via telephone (either spoken or via a touchtone keypad), via a transmission sent from an electronic device such as a mobile computing device of the customer, verbally, or otherwise. For example, the process 100 may display a question in a display device of the user, or in a display device of a customer service user, in the form of a word track: "Do you wish to rent a vehicle?" The customer may signal an answer to the question by interacting with a computer application executing in a device of the customer. The process 100 may receive an indication of whether the customer desires a rental vehicle (block 114). If the customer does desire a rental vehicle, then the process 100 may display a default word track to a user. For example, the process 100 may display a message, in a customer service management system, or in an application in a device of a customer, describing that the insurer has a contractual relationship with a particular auto rental vendor, and that the customer may rent from the contractual vendor or select another vendor (block 116). If the customer prefers an alternate vendor, then the customer may select the vendor from a predetermined list, or may manually supply information identifying the alternate vendor (block 118). If the customer selects an alternate vendor from the predetermined lists of alternate vendors, then rental rates for the preferred vendor and the alternate vendor may be retrieved from respective rate APIs, and base costs may be interpolated into a word track template allowing the customer to compare the rates. The process 100 may allow the customer to select or update their chosen vendor (block 124).

The process 100 may allow the searching for rental branches via a search interface. The search may be performed by a customer service user on behalf of the customer, in some embodiments. The process 100 may default to a branch within geographic proximity to a repair shop, if one has been previously selected by the customer. The process 100 may identify a previously selected repair shop by, for example, querying a database associated with the customer or a claim filed by the customer. The process 100 may select a default branch on the basis of proximity to the customer's residence (block 126). The process 100 may allow a branch to be selected (block 128). If a branch is not selected, the process 100 may allow modification of the search criteria (block 130). If no branch is selected, then the process 100 may display a self-service work track (block 132).

When a branch is selected, the process 100 may operate the trained ML model, providing ML parameters and/or other input collected from the customer and from other sources (e.g., from electronic databases) to compute out-of-pockets and/or average time to repair (block 134). For example, information regarding the vehicle that was damaged may be selected based on the customer's identity. The information may include vehicle characteristics such as make and model. The process 100 may include a data entry application accessible by a customer service user. The customer service user may use the application to enter a loss report and/or information relating to the accident and the scope and nature of the damage. The customer service user or the customer may select one or more types of damage from a list of damage codes/indicators. The indicators may include types and locations of damage with respect to the damaged vehicle (e.g., hood, windshield, front bumper, quarter-panel, door, airbag deployed, etc.). The process 100 may provide the loss report, indicators, etc. to the trained ML model to determine an average time to repair a vehicle of the type identified by the customer as having been damaged, and the process 100 may provide the scope of damage to the trained ML model as an input. Additional inputs may include current claim volume, and shop volume. Additional inputs may include rental coverage information, such as the number of days that the coverage is in effect for, how many days any repairs are estimated to take, how much rental coverage the customer has in dollar terms, and the base price of a vehicle class.

The ML model may analyze any of the inputs, including the loss report and volume data, to determine loss repair information. The loss repair information may be a composite number (e.g., a complex number), tuple, integer, real number, or any other suitable value. The process 100 may calculate a set of estimated out-of-pockets each corresponding to a respective vehicle class, based on the loss repair information, the vehicle rental coverage, and/or the estimated time to repair. For example, per-day base prices retrieved by the methods and systems from the rental API for budget-, intermediate-, and premium-class vehicles may be, respectively, $50, $75, and $115. An ML model may estimate the time to repair as six days for the customer's vehicle, with damage as reported by the customer in the loss report. An ML model may estimate the cost of repairs for the customer's vehicle to be $5000. The customer may have a collision insurance policy with a $1000 deductible and rental coverage of $500. In that case, the customer's out-of-pocket for the three rental classes over the six days may be the maximum of zero and the six-day cost, less the customer's rental coverage ([max(0,x-coverage) for x in (ndays*50,ndays*75,ndays*115)]):

| Budget | Intermediate | Premium |
|--------|--------------|---------|
| $0     | $70          | $190    |

In some embodiments, there may be more or fewer vehicle classes, and the repair cost may be computed according to different formulae. For example, in some embodiments, a customer may receive a rebate/discount or other incentive to choose one vehicle class over another. In addition, the process 100 may include instructions for displaying the vehicle classes in a drop-down list along with other information received from the rental vendor, such as images, vehicle descriptions (e.g., miles-per-gallon, etc.). The vehicle class first displayed may be a default vehicle class associated with the customer, as determined by querying an electronic database associated with the user. For example, if the customer is reporting a loss relating to a pickup truck, then the first vehicle rental class displayed may default to a pickup truck rental. The process 100 may allow the customer to select a vehicle from the list/set of available vehicle classes, and may then book a rental reservation on behalf of the customer using a rental API.

II. Repair Estimatics

FIG. 2 depicts an estimatics repair process 200 for providing repair estimatics to a user. The process 200 may be initiated at the time that a customer contacts an insurer to report damage claim or loss to a vehicle. The estimatics rental process 200 may receive an indication that the vehicle was damaged in a loss report (block 202). The user may provide the loss report to a customer service user via telephone and/or via an application (e.g., an application executing in a mobile device). Before providing estimatics services, the process 200 may execute eligibility rules (block 204). The eligibility rules are described herein and may include standard checks to determine/verify, for example, the identity of the person reporting the loss, the insurance coverage, the status of any insurance policies, etc. In some embodiments, an ML model may be trained using the principles described herein to create a model that evaluates eligibility based on training using historical claims determined to be eligible or not eligible.

When the vehicle is determined to be eligible for repair service, the process 200 may display a word track (block 206). For example, the word track may state that, "You have the right to select the repair facility of your choice for your vehicle repairs and only you can authorize repairs to your vehicle." The process 200 may receive an indication of whether physical damage is present in the loss (block 208). If damage is not present in the loss report, then the process 200 may inform the customer that the customer is not eligible for repair services (block 210). If the customer indicates that damage is present in the loss report, the process 200 may analyze the customer's loss report further.

The process 200 may determine whether the customer prefers a cash settlement by analyzing a loss report (block 212). If the customer does prefer a cash settlement, then the process 200 may display a word track (block 214). For example, the following word track may be displayed: "If you don't intend to have the vehicle repaired and would like to be paid for your damages, I can offer you other vehicle inspection options to have your vehicle inspected and a repair estimate written. Would you like to hear them?". The process 200 may display additional options to a customer who indicates a preference for a cash settlement (block 216). The options that may be offered to the customer who desires a cash settlement may include using an app, such as the Pocket Agent®/ Pocket Estimate application, which may allow a customer to enter the information necessary to determine a cash settlement. However, in some embodiments, the dynamic estimating options may not include use of the Pocket Estimate application (e.g., when the vehicle is older than two years).

Additional options that the process 200 may offer to the customer may include an inspection performed at a vehicle inspection site, and/or a staff estimate wherein a representative of the insurer may visit the customer to perform an estimate (block 218). When the customer indicates that the customer does not want a cash settlement the process 200 may perform shop estimatics (block 220).

The process 200 may perform shop estimatics by determining whether a customer has a shop selected (block 222). This determination may include prompting the customer to select a shop, or displaying a word track in an application that the customer or a customer service user accesses during the loss report. For example, in some embodiments, the systems and methods may "remember" that a user has filed a claim previously and may memorize the customer's information including their rental shop choice by associating the shop with the customer's profile. When the process 200 determines that the customer has already (and/or previously) selected a shop, the methods and systems may display a select service word track which may read as follows: "At State Farm®, we are proud to offer you a convenient repair option we call Select Service®. The Select Service program offers a number of conveniences and the peace of mind of a warranty provided by the repairer. Using this option allows you to take your vehicle directly to the Select Service repair facility of your choice for an estimate". This word track, like the others herein, may be displayed in a computing device of the user. In some embodiments, the word track may be displayed in a computing device used by a customer service user located at a customer service center (e.g., a call center). The customer service user may dictate the word track to the user verbatim. The customer service user may be prompted in the computing device used by that customer service user to actuate a button (e.g., "continue" or "next") after dictating the word track to the customer via telephone.

When the customer has not selected a shop, then the process 200 may display additional word track(s) as follows:

When you are ready to select a repair facility, you can either login to your statefarm.com account, contact your agent or contact your claim handler for assistance.

Our Select Service program is designed to expedite the repair process for you and offer other conveniences. SELECT SERVICE® provides the following:
    Written national limited lifetime repair warranty
    Guaranteed completion date for repairs
    Wash & vacuum of vehicle upon repair completion
    Pick up and delivery of your vehicle when requested
    Direct payment to the repair facility upon completion of repairs
    May offer other convenient services The process 200 may then display top select service shop results sorted by performance rating, from best to least well-performing (block 228). In some embodiments, shops previously used by a customer may be displayed, along with a word track: "Do you want to go to this shop again?". Reviews may be included alongside the select service shop results. In some embodiments, the process 200 may paginate and/or facilitate searching and/or filtering of the shops by name (block 230). The shops displayed may be select service contract shops, which are repair shops that have contractual agreements to perform repairs for an insurer under certain conditions (e.g., labor rates fixed within a geographic area, having certain quality standards in place, being equipped with the necessary technology to receive/transmit from the insurer's computer systems). By pre-qualifying service shops, and limiting the display of available options for repair to those available in the customer's geographic area, and for which the customer is eligible, the insurer improves the experience for customers and efficiencies for customers.

In an embodiment the list of shops process 200 selects for display may be selected on the basis of damage to the customer's vehicle. An ML model may be trained specifically for the purpose of classifying shops into categories based on each shop's respective capabilities. For example, some shops may be categorized as "fender bender," while others may be categorized as "high-impact". Others may be categorized as "heavy damage", etc. Historical loss reporting data and claims data may be analyzed for purposes of training a classification ML model. The classification model may analyze the vehicle make (e.g., Nissan) model (e.g., Murano) and repair cost ($20,000). The ML model may analyze the number of "supplements" that were required for a shop to repair an identical, or comparable, vehicle with identical, or comparable, damage; wherein a "supplement" is defined as the number of extensions that the shop required to the original estimate of repair time. A shop's classification may be accompanied by a score. The score may be a representation of the model's confidence that the shop belongs in a respective category. By collecting a set of shops belonging to one category, each shop having a respective score, and sorting the set of shops by order of score, a subset of the best- or worst-performing shops may be determined, with respect to a particular type and extent of vehicle damage.

In general, training ML models may include establishing a network architecture, or topology, and adding layers that may be associated with one or more activation functions (e.g., a rectified linear unit, softmax, etc.), loss functions and/or optimization functions. Multiple different types of artificial neural networks may be employed, including without limitation, recurrent neural networks, convolutional neural networks, and deep learning neural networks. Data sets used to train the artificial neural network(s) may be divided into training, validation, and testing subsets; these subsets may be encoded in an N-dimensional tensor, array, matrix, or other suitable data structures. Training may be performed by iteratively training the network using labeled training samples. Training of the artificial neural network may produce byproduct weights, or parameters which may be initialized to random values. The weights may be modified as the network is iteratively trained, by using one of several gradient descent algorithms, to reduce loss and to cause the values output by the network to converge to expected, or "learned", values. In an embodiment, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In some embodiments, multiple artificial neural networks may be separately trained and operated, and/or separately trained and operated in conjunction. In another embodiment, a Bayesian model may be used to train the ML model.

In an embodiment, the ML model may include an artificial neural network (ANN) having an input layer, one or more hidden layers, and an output layer. Each of the layers in the ANN may include an arbitrary number of neurons. The plurality of layers may chain neurons together linearly and may pass output from one neuron to the next, or may be networked together such that the neurons communicate input and output in a non-linear way. In general, it should be understood that many configurations and/or connections of ANNs are possible. In an embodiment, the input layer may correspond to input parameters that are numerical facts, such as the age and/or number of years of work experience of a person, or to other types of data such as data from the loss report. The input layer may correspond to a large number of input parameters (e.g., one million inputs), in some embodiments, and may be analyzed serially or in parallel. Further, various neurons and/or neuron connections within the ANN may be initialized with any number of weights and/or other training parameters. Each of the neurons in the hidden layers may analyze one or more of the input parameters from the input layer, and/or one or more outputs from a previous one or more of the hidden layers, to generate a decision or other output. The output layer may include one or more outputs, each indicating a prediction. In some embodiments and/or scenarios, the output layer includes only a single output.

For example, a neuron may correspond to one of the neurons in the hidden layers. Each of the inputs to the neuron may be weighted according to a set of weights $W_1$ through $W_i$, determined during the training process (for example, if the neural network is a recurrent neural network) and then applied to a node that performs an operation α. The operation α may include computing a sum, a difference, a multiple, or a different operation. In some embodiments weights are not determined for some inputs. In some embodiments, neurons of weight below a threshold value may be discarded/ignored. The sum of the weighted inputs, $r_1$, may be input to a function which may represent any suitable functional operation on $r_1$. The output of the function may be provided to a number of neurons of a subsequent layer or as an output of the ANN.

Once the customer has selected a select service shop, the process 200 may confirm the customer's acceptance of the select service shop and/or automate attachment of the select service shop to the loss report submitted by the customer (block 234). In some embodiments, a customer service user may confirm/activate the attachment via interaction with a display device. The customer may confirm acceptance by interacting with process 200 (e.g., as embodied in an electronic application executing in the customer's mobile device, or over the internet via a web site) or via another electronic means (e.g., by telephone, email, etc.). If a customer is indecisive regarding selecting a select service shop, then a self-service word track may be displayed as described above (block 236). If a customer declines an offer of a select service shop, then the process 200 may display a non-program word track, which may read as follows: "You are free to select repairers who do not have agreements with State Farm. Not all repair facilities charge the same amount for vehicle repairs. Any additional payment will be based upon supplemental amounts agreed to by State Farm. You may be responsible for any amounts not agreed to by State Farm. This may include, but may not be limited to, storage fees and rental expenses." (block 238). The process 200 may then permit the customer to add a non-select service shop (block 240). The customer may do so by entering the information into a computing application or by dictating the shop information to a call center representative. If the customer chooses to select a non-select service shop, then the process 200 may display alternate estimatics options for determining a cash settlement as described above with respect to block 216.

III. Estimatics Eligibility

FIG. 3 depicts an example eligibility rule set 300 used to determine select service eligibility, according to one embodiment and scenario. The eligibility rule set 300 may include a series of Boolean conditions for determining eligibility. For example, some of the conditions that may be evaluated according to Boolean-AND (&&) logic operation. That is, if any of the conditions in the overall expression evaluates to False, then the entire statement evaluates to False. The eligibility rule set 300 may correspond to the eligibility rules executed by process 100 of FIGS. 1A and 1B and process 200 of FIG. 2A and FIG. 2B as described above. For example, the eligibility rules may be executed by process 200 at block 204. The eligibility rules may be executed at block 106 of process 100.

The conditional operands comprising eligibility rule set 300 may be determined by a method or system retrieving information from a loss report and/or other information sources. For example, the conditional "Date of loss is less than 180 days from Date Reported" may be determined by computing the difference in time between the "loss date" and "report date" dates from the loss report. The difference in time may be stored as a number of seconds, and then converted to a number of days by the methods and systems to determine the truth of the conditional. In some embodiments, core select eligibility may be evaluated in response to an action performed by the customer, for example, and without limitation: when the customer places a call to the insurer's call center, launches a mobile application, enters data into a web form, or submits a loss report. Alternatively, and/or in addition, core select eligibility may be evaluated when a customer service user performs an action.

IV. Estimatics Environment

Figure 1B:
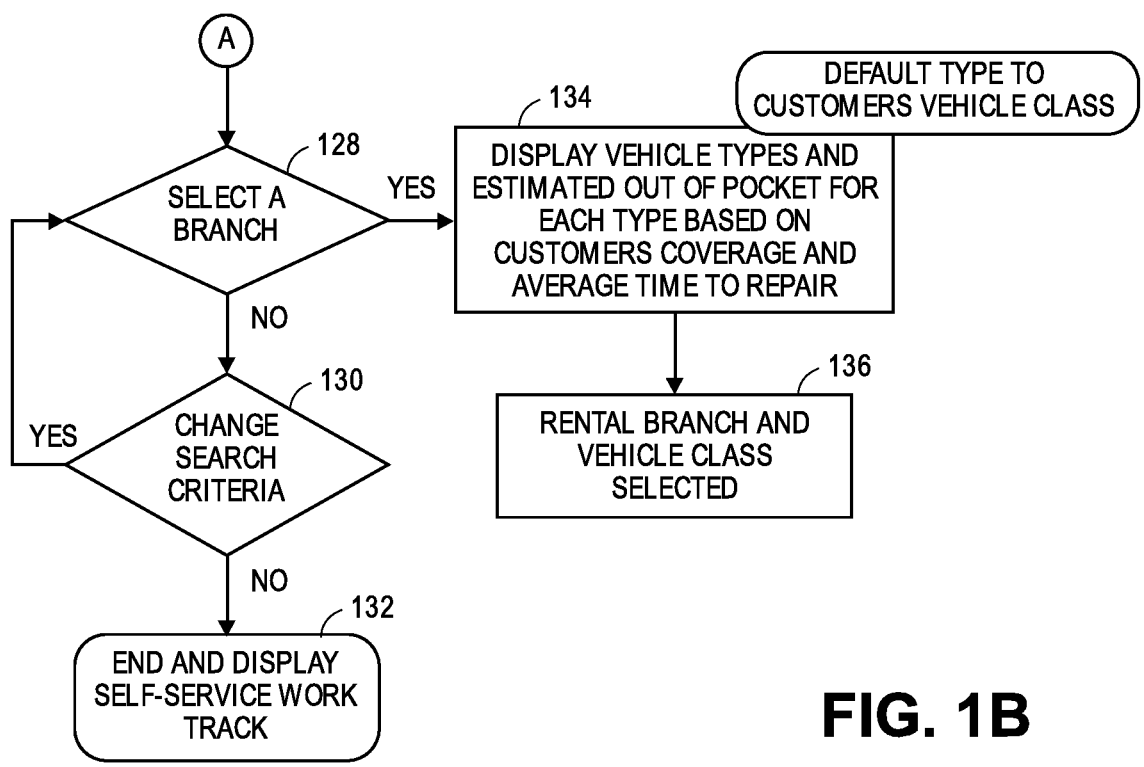
Figure 2A:
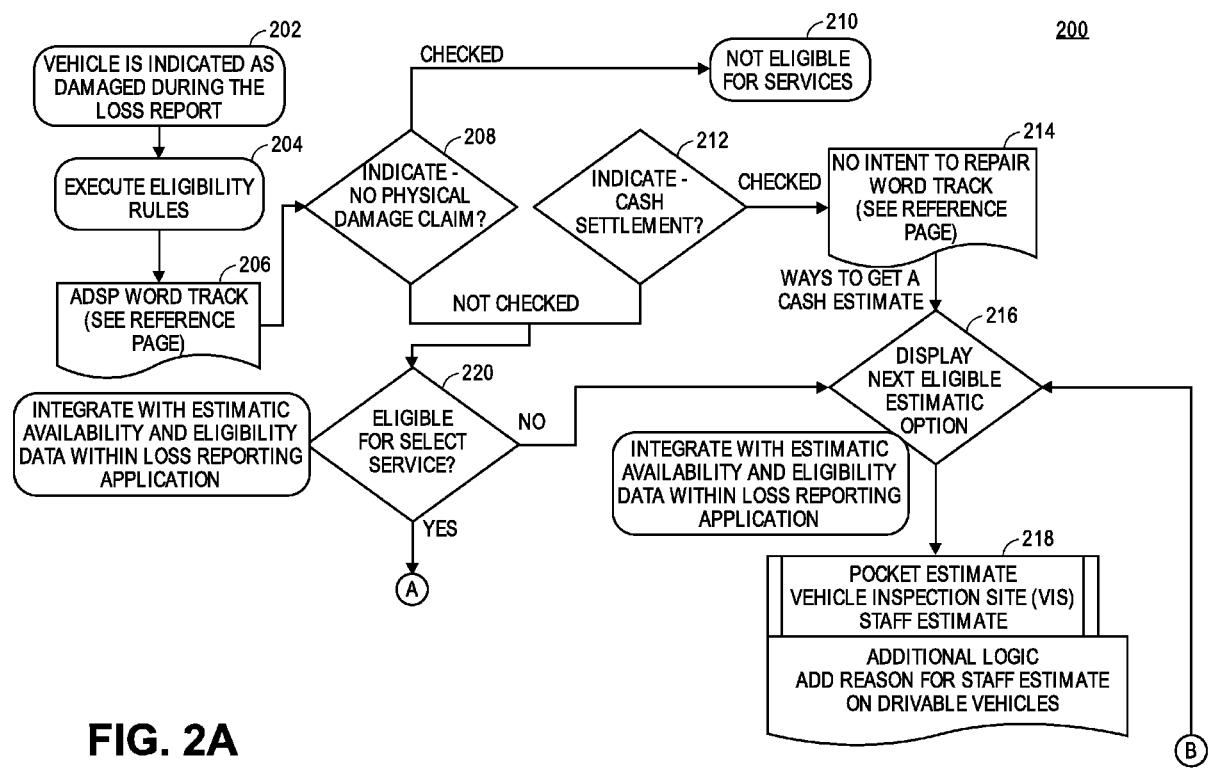
FIG. 2A and FIG. 2B are flow diagrams depicting an example process for providing smart auto repair estimatics, according to one embodiment.
Figure 2B:
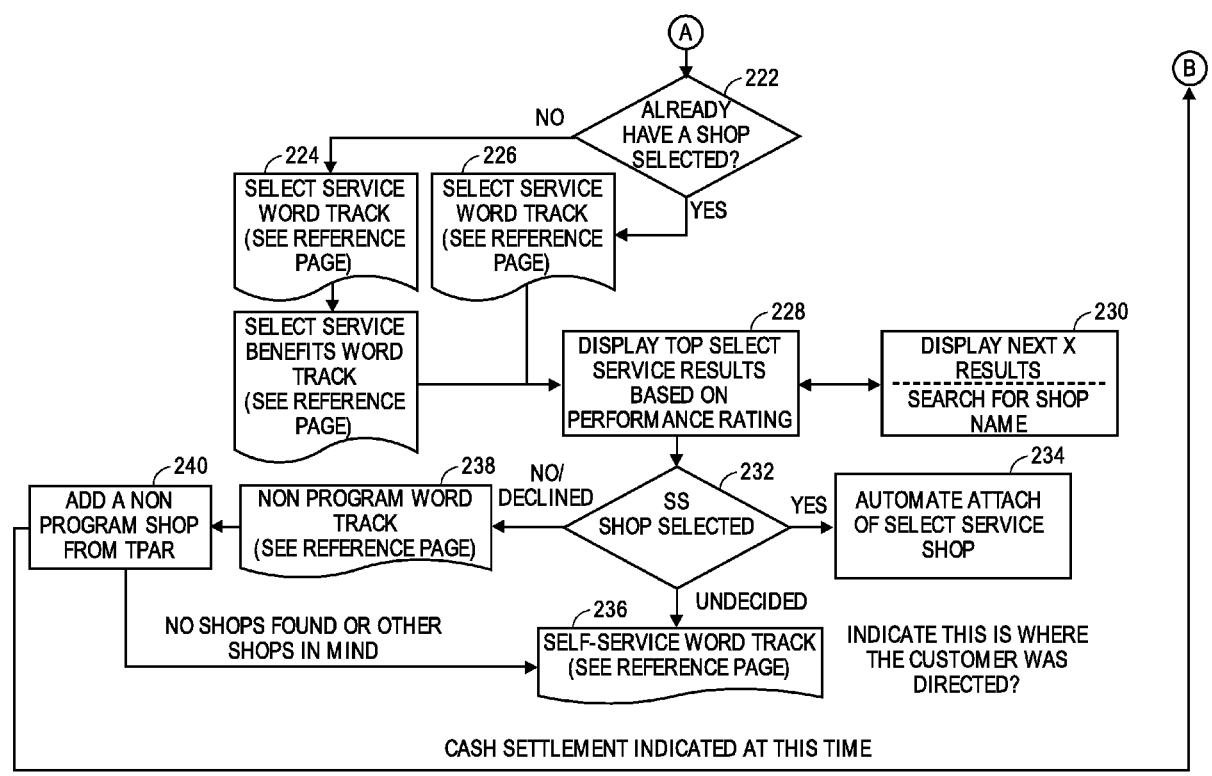
Figure 4:
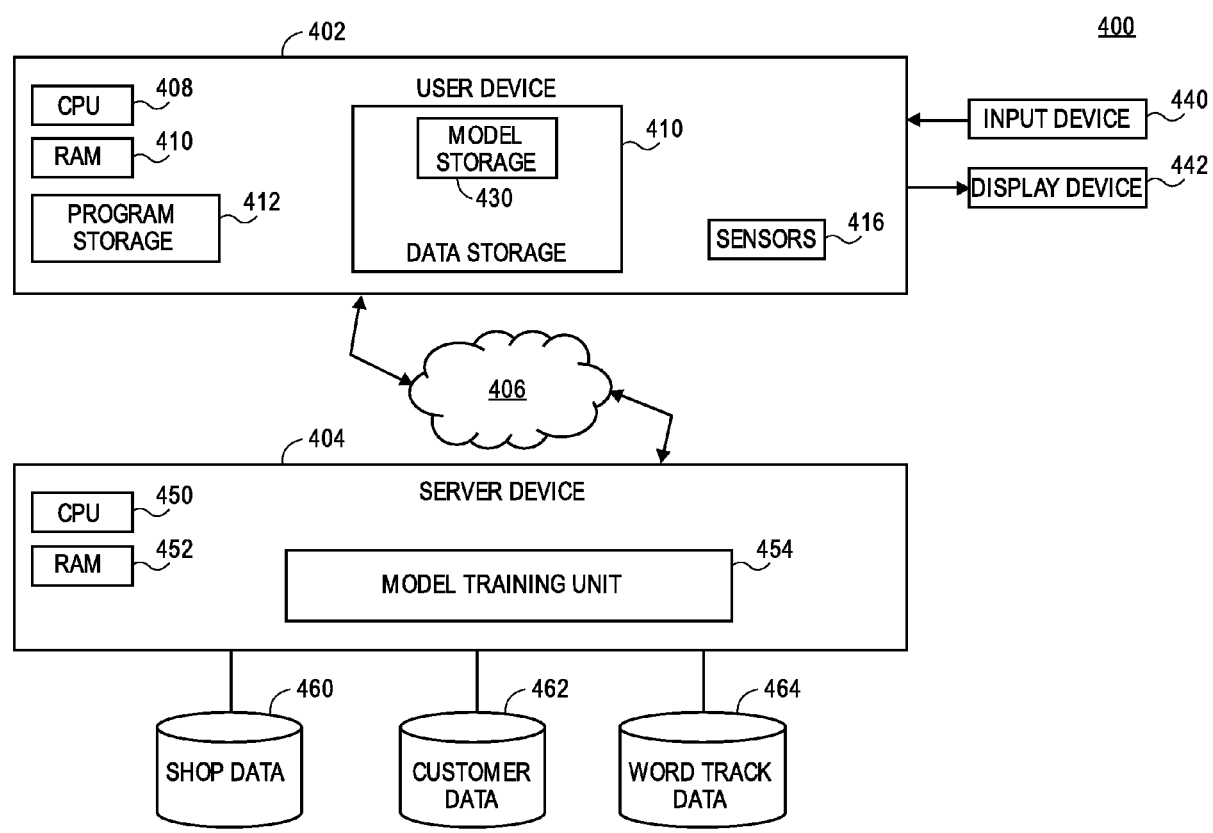
FIG. 4 depicts an example environment in which the data flows depicted in FIGS. 1A-1B and FIGS. 2A-2B may be implemented, according to some embodiments and scenarios.

FIG. 4 depicts an example environment 400 in which the process depicted in FIGS. 1A-1B and the process depicted in FIGS. 2A-2B may be implemented, according to some embodiments and scenarios. The environment 400 includes a user device 402 and a server device 404. The user device 102 and the server device 404 are communicatively coupled via a network 406, in the depicted embodiment. The server device 404 may host services relating to neural network training and operation, which may be accessed/utilized by the server device 404 and the user device 402. While FIG. 4 shows only a single user device 402, it is understood that multiple different user devices (of different entities and/or users), may be in remote communication with the server 404 via the network 406 and/or one or more other networks. The network 406 may be a single communication network, or may include multiple communication networks of one or more types (e.g., one or more wired and/or wireless local area networks (LANs), and/or one or more wired and/or wireless wide area networks (WANs) such as the Internet). The network 406 may comprise any type or types of suitable network(s).

The user device 402 may be a laptop computer, desktop computer, tablet, smartphone, wearable device, or any other suitable type of personal and/or mobile computing device. Alternatively, the user device 402 may be a relatively "dumb" node or terminal, such as an IoT device with little memory and/or processing power. The user device 402 may include a central processing unit (CPU) 408. While referred to in the singular, the CPU 408 may include any suitable number of processors of one or more types (e.g., one or more CPUs, graphics processing units (GPUs), cores, etc.).

In the embodiment of FIG. 4, the user device 402 may also include a random access memory (RAM) 410, a program storage 412, a data storage 410 including a model storage 430 and one or more sensors 416. The data storage 410 may include one or more persistent memories (e.g., a hard drive and/or solid state memory) and may store data used by and/or output by one or more applications, including a trained ML model. Model storage 430 may include inchoate models, models that are in the process of being trained, and/or already-trained models. The user device 402 may include an input device 440 and a display device 442. The input device may include any suitable input device (e.g., keyboard, mouse, etc.) and attendant software (e.g., drivers). The display device 442 may be any suitable display device such as a computer monitor, screen, etc. In some embodiments, the input device 410 and display device 442 may be integrated into a single device such as a capacitive touch screen.

Generally, the CPU 408 may be configured to execute software instructions stored in the program storage 412, which may be loaded into the RAM 410. The program storage 412 may contain software instructions used to launch, initialize, and/or execute the trained models in model storage 430. The software instructions may access (i.e., read data from and/or write data to) the data storage 410 and the data storage 410 as needed. Portions of the software instructions and/or data may be loaded into the RAM 410 when the CPU 408 executes the software instructions. For example, the trained ML model may be loaded into the RAM 410 when the processes depicted in FIG. 1 and FIG. 2 utilize the trained ML model to analyze loss reports and other inputs to determine aspects of repair and rental estimatics.

Further, the software instructions may load data generated by the sensors 416 into the RAM 410 and may store data in the data storage 410. Each of the sensors 416 may be configured to detect and convey physical measurement data, including without limitation: photographic (video or still images), infrared, speed, temperature, audio, acceleration, humidity, atmospheric pressure, and/or other physical measurement data. For instance, the sensors 416 may include one or more microphones to capture audio data. It should be appreciated that many useful combinations of sensors and trained ML models are envisioned, and that many data sources may be available via device sensors. The sensors 416 may generate digital data in a standard file encoding and/or compressed file format, and may capture data automatically or in response to a request from a user.

The server device 404 may be located remotely from the user device 402, and the server device 404 may be an individual server, or may include a group or cluster of multiple servers. The server device 404 may be operated in a cloud computing and/or virtualized computing environment. The server device may correspond to a call center computing server, which may be integrated with a computerized telephone system such as a private branch exchange (PBX). Like the user device 402, the server device 404 may contain a CPU 450, which includes one or more processors, and a RAM 452. In the embodiment of FIG. 4, the server device 404 also includes a model training unit 454 which may be used to train and/or operate ML models. Once trained, the models may be persisted to a data storage such as the data storage 410. The models may also be stored in the server device 404 and/or loaded into RAM 452. Additionally, the server device 402 may include a shop data 460, a customer data 462, and a word track data 464. The shop data 460 may include data related to shops (e.g., addresses, locations, and/or repair times with respect to multiple vehicle classes/ makes/models). The customer data 462 may include data relating to customer demographics (e.g., name, address, telephone number) which may be related to policy information. For example, the server device 404 may include instructions for executing a query to retrieve a data set of a customer's demographic information linked (e.g., by a structured query language JOIN operation) to all claims pending and/or filed by that customer. The word track 464 data may be an electronic database in which word tracks are stored. The word tracks may be stored in static and/or template form.

In operation, a customer may access the server device 404 via an electronic connection. The electronic connection may be via telephone and/or via a computer application executing in user device 402 and/or server device 404. The customer may access server 404 via network 406. When the customer accesses server 406, the identity of the customer may be established by querying customer data 462. For example, the customer's telephone number may be used to locate a user profile of the customer. The customer may indicate the customer's intent either verbally or via the computer application. For example, the customer may indicate the intent to complete a loss report relating to damage to the customer's vehicle for the purpose of obtaining rental and/or repair estimates, as described with respect to process 100 and 200, respectively. As discussed above, when the customer is accessing server 404 via telephone, a customer service user may answer the customer's call and enter data into data sources (e.g., customer data 462) on behalf of the customer. The data collected may include loss report information, such as the date, time, and circumstances of the loss the customer is reporting. In some embodiments, photos collected from sensors 416 may be analyzed to determine whether a vehicle is a total loss. A separate ML model may be trained for this purpose using images from historical claims that correspond to total losses as training data. The customer service user may be guided through the collection of the loss report by a loss report collection application, which may correspond to process 100 and/or process 200, in some embodiments.

The loss report collection application may be an application executing in a module of server device 404, and the loss report collection application may include instructions for operating a trained ML model residing in model training unit 454, using information in the loss report as input, to predict a time to repair, cost to repair, and/or severity of damage to the vehicle. The trained ML model may, while executing, be represented in the RAM 452 of the server device 404. While FIG. 4 depicts an embodiment wherein the user device 402 is provided in a networked environment, it should be understood that other embodiments are possible. In some embodiments, the trained ML model may be stored in the model storage 430 of the client device 402, and may be loaded into the RAM 410.

Continuing the above example, the customer may provide loss report information such as the type of loss (e.g., collision, liability, etc.), description of damage, etc. In an embodiment the customer may provide this information via the input device 440. Server device 404 may transmit a word track via network 406 to client device 402. An application executing in client device 402 may receive the word track and display it in the display device 442. Such transmission and display may occur during the execution of process 100 and process 200, for example. The loss report collection application may continuously prompt the customer directly and/or via a customer service user to provide loss report data until sufficient data is collected to operate the trained ML model. Once that data has been collected, the server 406 may execute the trained ML model to predict aspects of rental and repair estimates. The server device 404 may also execute eligibility rules via CPU 450 as discussed with respect to FIG. 3, and may retrieve those rules from an electronic database associated with server device 404. Server device 404 may be communicatively coupled to one or more APIs which may allow server device 404 to obtain real-time information relating to rentals, as discussed with respect to process 100. Once a customer confirms a rental selection, server device 406 may transmit a reservation request via network 406 to a client device 402 operated by a rental vendor.

In an embodiment, server device 404 may provide one or more estimatics API which may be called by client applications to retrieve information relating to estimatics availability and/or eligibility. In some embodiments, client device 402 may be integral to vehicle, or associated with a vehicle, such that client device 402 may receive vehicle telematics data. An application executing in server device 404 may receive the vehicle telematics data and determine, by analyzing the vehicle telematics data with a trained ML model, whether the vehicle is able to be driven. Such information may be used in the estimation of the extent of damages, including whether the damage to the vehicle represents a total loss.

V. Exemplary Estimatics Methods

Figure 5:
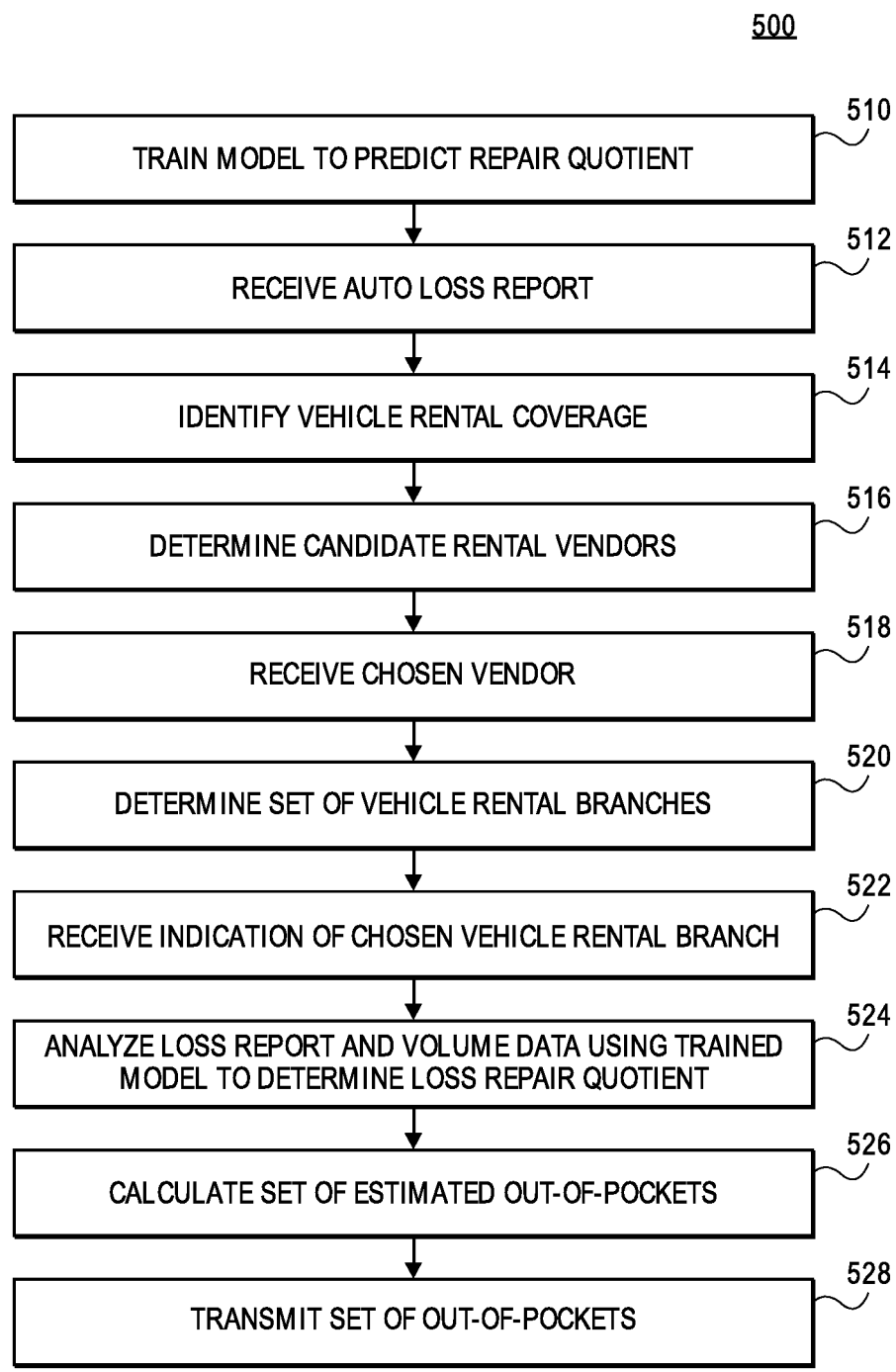
FIG. 5 is an example flow diagram depicting a method of providing smart auto rental estimatics, according to one embodiment.

FIG. 5 is an example flow diagram depicting a method 500 of providing smart auto rental estimatics to a user, according to one embodiment. The method 500 may include training a model to predict a time to repair and a cost to repair (block 510). The method 500 may include receiving an auto loss report (block 512). The loss report may be analyzed to identify a vehicle rental coverage associated with the user (block 514). The method 500 may include determining a candidate set of rental vendors (block 516). The candidate set of rental vendors may be determined by querying shop data 460. In some embodiments, a shop's schedule may be integrated with/ accessible to the method 500, to allow for the method 500 to place an appointment for the customer directly into the shop's calendar. The method 500 may include receiving an indication of a chosen vehicle vendor from the user, wherein the chosen vendor is selected from the candidate set of rental vendors (block 518). The candidate set may be transmitted to client device 402 via network 406. The method 500 may include determining a set of vehicle rental branches based on the chosen vehicle rental vendor and the location of the user (block 520). The location of the user may be determined by reference to a user profile associated with the user and stored in an electronic database (e.g., customer data 462) or provided by the user (e.g., via a geolocation service executing in the client device 402). The method 500 may include receiving an indication of a chosen vehicle rental branch from the user. The user may choose the vehicle rental branch by verbally instructing a customer service user or by interacting with an input device (e.g., input device 440) (block 522). The method 500 may include analyzing a loss report, claim volume data, and shop volume data using a trained machine learning model to predict a loss time to repair and loss cost to repair (block 524). An estimated set of estimated out-of-pockets may be determined by analyzing the output of the trained machine learning model, as discussed above with respect to process 100 and process 200. The method 500 may include transmitting the estimated out-of-pockets to the user.

Figure 6:
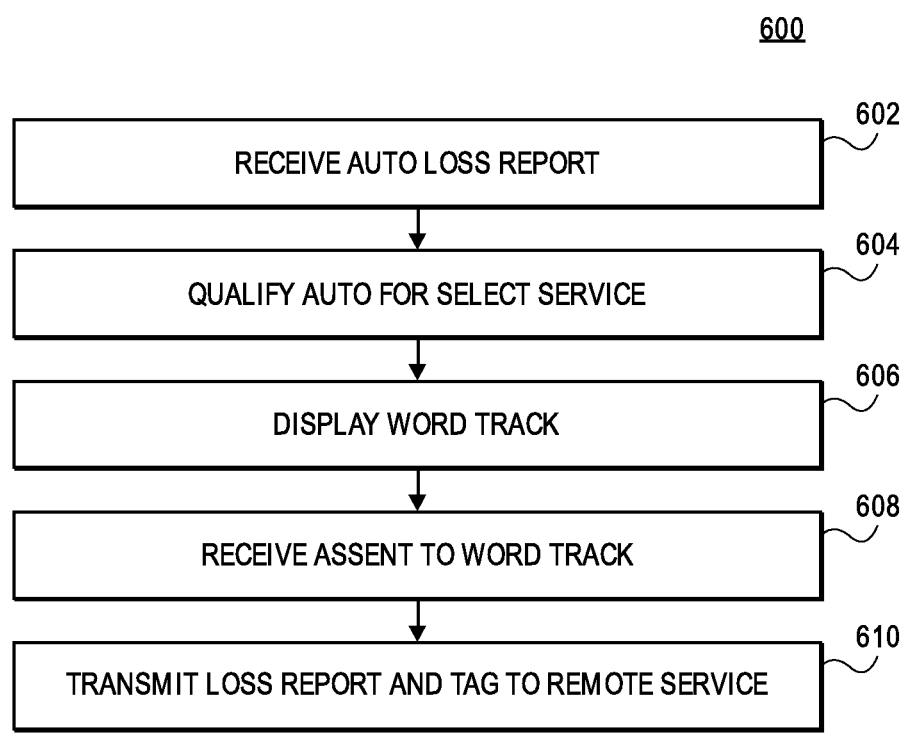
FIG. 6 is an example flow diagram depicting a method of providing smart auto repair estimatics, according to one embodiment.

FIG. 6 is an example flow diagram depicting a method 600 of providing smart auto repair estimatics, according to one embodiment. The method 600 may include receiving an auto loss report (block 602). The loss report may include a tag uniquely identifying an auto (e.g., a telephone number of a caller, a license plate number or vehicle identification number (VIN), etc.). The loss report may be received by server 404 via network 406. The method 600 may include qualifying the user for select service by executing a series of eligibility rules (block 604). An application executing in the server device 404 and/or the client device 402 may execute the eligibility rules. In some embodiments, eligibility for select service repair may include analyzing the identity of the user, one or more insurance policies/coverages associated with the vehicle identified in the loss report, other information included in the loss report (e.g., date of loss), ownership/title of the vehicle, and/or a business classification of the vehicle. The method 600 may include displaying a word track (block 606). The word track may be displayed in a display device of the server device 404 and/or the client device 402, and may include a set of select service shops, the word track based on qualifying the auto for select service. The method 600 may include receiving an assent to the word track, the assent indicating that the customer's intent to repair the customer's damaged vehicle at a particular select service shop (block 608). The method 600 may include transmitting the loss report and the tag to a remote computing device associated with the select service shop chosen by the user.

In some embodiments, information relating to next best actions may be displayed at the conclusion of an estimatics process. For example, the method 500 and/or the method 600 may provide the customer with an estimate of how long it will take to process their claim. Next best actions information may be determined by training an ML model using claim history data, and data that the customer has entered into the loss entry report may be provided as input to the trained model. Next best actions may be displayed in a wrap-up screen that is used by a customer service user. For example, the customer may have chosen select service and a rental. Select service and rental may be provided to the trained model, which based on historical claim data, may determine that the wait time will be five days. The wait time for the repair may include volume data, as described herein, as well as historical shop efficiency data. Next best actions may be available to injury claims, total loss claims, and vehicle loss claims.

VI. Estimatics Benefits

Problems in the current state of the art for customers include the fact that customers are confused by the number of options offered to them during first notice of loss interactions. This has the effect of reducing claims in the optimal path (i.e., selecting select service during the initial call) and causes customers to pivot to self-service options, which are inefficient. Applicant measured that only around half of all loss reports filed over a three-month period were in claims filed in the optimal path, and channel switching in non-select service types is high.

| Estimatic Type | Jan | Feb | March |
| --- | --- | --- | --- |
| Select Service | 16.7% | 16.2% | 14.6% |
| RFR | 25.3% | 24.0% | 20.0% |
| Pocket Estimate | 59.4% | 58.2% | 75.8% |
| Staff | 39.5% | 41.3% | 47.9% |
| Estimate Assist | 27.1% | 26.9% | 30.2% |
| VIS | 38.9% | 40.4% | 53.4% |
| Total Assignment Changes | 25.7% | 25.8% | 25.4% |

Due to a lack of education and information available when making an initial decision, customers often switch between estimatics channels which increases customer effort, increases touches (inbound and outbound calls), and reduces automation. Customers are not provided insights into the impact of their decisions on the overall claim outcome and the process of repair. Customers are asked the same questions regarding their repair options regardless of their individual loss characteristics. Customers do not have a way to estimate out of pocket cost, range of repair cost, and estimated time of repair. Customers are not provided timely and relevant updates in a consumable manner specifically around their repair and rental interactions, expectations, and statuses. Customers are accustomed to taking photos of accidents and keen to share information electronically, but the industry is not providing easy options to enable such interactions.

Problems in the current state of the art for customer service associates include the fact that associates have to reference multiple applications to determine availability and eligibility for every customer. Associates do not have a technology solution to offer the best estimatic option based on specific claim characteristics. Associates are required to use legalistic, jargon oriented language that is difficult for customers to comprehend. Lack of data integration (e.g., shops schedules, claim volume in market area, shop specialization on type of damage) making it difficult to truly know the best option and set expectations with the customer.

Without the above-described workflows in place, customers may cast about for repair options (i.e., "channel-switch") from an estimation app, to a vehicle inspection site, to a field estimator. The customer may need to call the insurer repeatedly. Currently, the process of rental and repair estimation is performed by a claim handler/customer service user manually querying in a first system for a customer's zip code based on a claim resource locator to determine whether select service is available in the customer's area. The customer service representative is required to manually copy and paste information from the first system into a second location to find shop locations. The customer service user must examine each result to determine/verify whether the shop location is, in fact, a select service location. The customer service user must search a third system to locate details of the customer's insurance coverage. Due to the inefficiencies wrought by different incompatible computer systems, a claim handler/customer service user may set up an estimate that is unavailable to the customer based on coverage that does not exist or under a service tier for which the customer is not eligible. The customer service user may attach the wrong shop to the loss report. Manual navigation through multiple disconnected tools to identify what may be available and the customer may be eligible for in a zip code location. As noted, errors often occur in offering options due to manual cross referencing of tools. Currently, all available options appear for a customer service user to see with no filtering.

All of the errors that may occur throughout the process have the potential to infuriate customers and waste their time. By automating the estimatics process, the process is error proofed, which drastically reduces work for the insurer and the customer as the loss report is submitted and after it is submitted. Applicant has conducted limited testing and determined conclusively that estimatics type switching is reduced drastically by the implementation of the methods and systems described herein. Applicant has also determined conclusively via testing that how quickly a customer receives an estimate demonstrates a correlation to the reduction of manual interactions, and that the estimatic type utilized by a customer is a significant determinant of the number of manual interactions. For example, a customer who obtains a self-service estimate at a vehicle inspection site may have, on average, seven more "touches" or interactions with telephone customer support.

The methods and systems described herein introduce technology enhancements that simplify availability and eligibility of claim assignments and introduce personalization based on similar characteristics of other claims. Additionally, the insurer may align metrics and reporting to claim handling outcomes so leaders can coach associates with better outcomes in mind, and track performance. Customer service users may access a dashboard that includes channel switching metrics and touch metrics, and which includes trend information. Currently, this data is not available to customer service users so they have no way to understand the amount of channel-switching or subsequent touches. As described, the methods provide dynamic estimatics by integration of multiple disparate tools such as claim resource locator, eligibility rules, repair facility resource, standard claims processes and procedures, inspection options tool, and dynamic vehicle assessment model. Currently these tools must all be accessed individually. Combining logic into the methods and systems described herein will improve the efficiency of the estimatic process, and will also allow the associates to only offer options to customers that are available and that they are eligible for. The methods and systems described herein also include more advanced functionality which pulls data from other sources (shops schedules, claim volume, cross reference with rental vendors) for a true "best" offering for estimatic options based on specific claim characteristics.

Estimatics personalization is another benefit offered by the methods and systems. It works by integrating multiple tools and logic to allow for a more personalized approach for estimatic recommendations than customers have today, as well as model-driven personalization and shop recommendations based on specific characteristics of each claim. The methods and systems also provide estimatics education to customers by improved and simplified messaging during loss reporting, utilization of on demand text/email and enhanced messaging to further educate each customer on recommendations for estimatic selection and best options. This includes the integration of next best actions and next steps model, to address factors that are likely to create increased calls or tasks. In the methods and systems described herein, data is integrated to educate the customer with clear expectations for repair timeline based on market area and specific claim criteria. By cross referencing rental and repair data, the customer is educated on repair times and potential out-of-pocket costs associated with rental and repair at each stage of the process.

Additional Considerations

With the foregoing, any users (e.g., insurance customers) whose data is being collected and/or utilized may first opt-in to a rewards, insurance discount, or other type of program. After the user provides their affirmative consent, data may be collected from the user's device (e.g., mobile device, smart vehicle controller, or other smart devices). Of course, local storage and use of a machine learning model at a user device may have the benefit of removing any concerns of privacy or anonymity, by removing the need to send any personal or private data to a remote server. In such instances, there may be no need for affirmative consent.

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term ' — ' is hereby defined to mean..." or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Unless a claim element is defined by reciting the word "means" and a function without the recital of any structure, it is not intended that the scope of any claim element be interpreted based upon the application of 35 U.S.C. § 112(f). The systems and methods described herein are directed to an improvement to computer functionality, and improve the functioning of conventional computers.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for carrying out the methods and systems disclosed herein, through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

What is claimed is:

1. A computer-implemented method for providing smart auto rental estimatics to a user, the method comprising:
   receiving, via a processor, an auto loss report,
   extracting, via one or more processors, machine learning parameters from the auto loss report, wherein the machine learning parameters comprise one or more user characteristics and one or more vehicle characteristics,
   analyzing the machine learning parameters to identify a vehicle rental coverage associated with the user,
   determining, via a processor, a candidate set of vehicle rental vendors,
   receiving, via a processor, an indication of a chosen vehicle rental vendor, the chosen vendor included in the candidate set of vehicle rental vendors,
   determining, based on the chosen vehicle rental vendor and the location of the user, a set of vehicle rental branches,
   receiving via a processor, an indication of a chosen vehicle rental branch, the chosen vehicle rental branch included in the set of vehicle rental branches,
   analyzing, using a trained machine learning model, the machine learning parameters and a volume data to determine a loss time to repair and a loss cost to repair, the volume data corresponding to real-time information pertaining to claim volume and/or shop volume, and the loss time to repair indicating a wait time the user is predicted to require a rental vehicle,
      the trained machine learning model associated with a plurality of training parameters and trained to predict a repair time to repair and a cost to repair using
         historical claim information, including historical user characteristics and historical vehicle characteristics, and
         one or both of (i) historical shop volume and (ii) historical claim volume,
         wherein at least a portion of the historical claim information is encoded as labels in a labeled data set that is used to train the machine learning model, images from at least a portion of the historical claim information are used to train the machine learning model, and at least one of the plurality of training parameters is modified as the machine learning model is iteratively trained,
   calculating, based on the loss time to repair, the loss cost to repair, and the vehicle rental coverage a set of estimated out-of-pockets each corresponding to a respective vehicle class; and
   transmitting, via a processor, the set of estimated out-of-pockets.

2. The computer-implemented method of claim 1, wherein calculating set of estimated out-of-pockets each corresponding to a respective vehicle class includes calculating the maximum of zero and a per-day cost, less the customer's rental coverage.

3. The computer-implemented method of claim 1, wherein the method is implemented in one or both of (i) a call center computing system accessible by a customer service user and (ii) an application executing in a mobile device of the user.

4. The computer-implemented method of claim 1, wherein analyzing the machine learning parameters to identify the vehicle rental coverage associated with the user includes querying customer insurance policy information in an electronic database.

5. The computer-implemented method of claim 1, wherein receiving, via a processor, the indication of the chosen vehicle rental vendor, the chosen vendor included in the candidate set of vehicle rental vendors includes displaying a default word track to the user.

6. The computer-implemented method of claim 1, wherein determining, based on the chosen vehicle rental vendor and the location of the user, the set of vehicle rental branches includes searching for rental branches via a search interface.

7. The computer-implemented method of claim 1, wherein the trained machine learning model is further trained by analyzing vehicle feature information relating to a year, a make, and/or a model.

8. The computer-implemented method of claim 1, wherein the trained machine learning model is further trained by analyzing the vehicle class.

9. A computing system comprising:
   one or more processors; and
   one or more memories storing instructions that, when executed by the one or more processors, cause the computing system to:
      receive, via the one or more processors, an auto loss report,
      extract, via one or more processors, machine learning parameters from the auto loss report, wherein the machine learning parameters comprise the one or more user characteristics and one or more vehicle characteristics,
      analyze the machine learning parameters to identify a vehicle rental coverage associated with the user,
      determine, via the one or more processors, a candidate set of vehicle rental vendors,
      receive, via the one or more processors, an indication of a chosen vehicle rental vendor, the chosen vendor included in the candidate set of vehicle rental vendors,
      determine, based on the chosen vehicle rental vendor and the location of the user, a set of vehicle rental branches,
      receive, via the one or more processors, an indication of a chosen vehicle rental branch, the chosen vehicle rental branch included in the set of vehicle rental branches,
      analyze, using a trained machine learning model, the machine learning parameters and a volume data to determine a loss time to repair and a loss cost to repair, the volume data corresponding to real-time information pertaining to claim volume and/or shop volume, and the loss time to repair indicating a wait time the user is predicted to require a rental vehicle, the trained machine learning model associated with a plurality of training parameters and trained to predict a repair time to repair and a cost to repair using historical claim information including historical user characteristics and historical vehicle characteristics, and one or both of (i) historical shop volume and (ii) historical claim volume, wherein at least a portion of the historical claim information is encoded as labels in a labeled data set that is used to train the machine learning model, images from at least a portion of the historical claim information are used to train the machine learning model, and at least one of the plurality of training parameters is modified as the machine learning model is iteratively trained, calculate, based on the loss time to repair, the loss cost to repair, and the vehicle rental coverage a set of estimated out-of-pockets each corresponding to a respective vehicle class, and transmit, via the one or more processors, the set of estimated out-of-pockets.

10. The computing system of claim 9, the one or more memories storing further instructions that, when executed by the one or more processors, cause the computing system to:
calculate the maximum of zero and a per-day cost, less the customer's rental coverage.

11. The computing system of claim 9, the one or more memories storing further instructions that, when executed by the one or more processors, cause the computing system to:
query customer insurance policy information in an electronic database.

12. The computing system of claim 9, the one or more memories storing further instructions that, when executed by the one or more processors, cause the computing system to:
display a default word track to the user.

13. The computing system of claim 9, the one or more memories storing further instructions that, when executed by the one or more processors, cause the computing system to:
search for rental branches via a search interface.

14. A non-transitory computer readable medium containing program instructions that when executed, cause a computer to:
receive, via the one or more processors, an auto loss report,
extract, via one or more processors, machine learning parameters from the auto loss report, wherein the machine learning parameters comprise one or more user characteristics and one or more vehicle characteristics,
analyze the machine learning parameters to identify a vehicle rental coverage associated with the user,
determine, via the one or more processors, a candidate set of vehicle rental vendors,
receive, via the one or more processors, an indication of a chosen vehicle rental vendor, the chosen vendor included in the candidate set of vehicle rental vendors,
determine, based on the chosen vehicle rental vendor and the location of the user, a set of vehicle rental branches,
receive, via the one or more processors, an indication of a chosen vehicle rental branch, the chosen vehicle rental branch included in the set of vehicle rental branches,
analyze, using a trained machine learning model, the machine learning parameters and a volume data to determine a loss time to repair and a loss cost to repair, the volume data corresponding to real-time information pertaining to claim volume and/or shop volume, and the loss time to repair indicating a wait time the user is predicted to require a rental vehicle, the trained machine learning model associated with a plurality of training parameters and trained to predict a repair time to repair and a cost to repair using historical claim information including historical user characteristics and historical vehicle characteristics, and one or both of (i) historical shop volume and (ii) historical claim volume, wherein at least a portion of the historical claim information is encoded as labels in a labeled data set that is used to train the machine learning model, images from at least a portion of the historical claim information are used to train the machine learning model, and at least one of the plurality of training parameters is modified as the machine learning model is iteratively trained, calculate, based on the loss time to repair, the loss cost to repair, and the vehicle rental coverage a set of estimated out-of-pockets each corresponding to a respective vehicle class; and transmit, via the one or more processors, the set of estimated out-of-pockets.

15. The non-transitory computer readable medium of claim 14 containing further program instructions that when executed, cause a computer to:
calculate the maximum of zero and a per-day cost, less the customer's rental coverage.

16. The non-transitory computer readable medium of claim 14 containing further program instructions that when executed, cause a computer to:
query customer insurance policy information in an electronic database.

17. The non-transitory computer readable medium of claim 14 containing further program instructions that when executed, cause a computer to:
display a default word track to the user.

18. The non-transitory computer readable medium of claim 14 containing further program instructions that when executed, cause a computer to:
search for rental branches via a search interface.

* * * * *